United States Patent [19]

Dinges et al.

[11] 4,004,465
[45] Jan. 25, 1977

[54] OPTICAL WINDOW PROTECTIVE SHUTTER MECHANISM

[75] Inventors: Richard A. Dinges, Resda; Morris Weber, Sherman Oaks, both of Calif.

[73] Assignee: The United States of America as represented by the Secretary of the Air Force, Washington, D.C.

[22] Filed: Jan. 20, 1976

[21] Appl. No.: 650,590

[52] U.S. Cl. .................................. 74/84 R; 74/436
[51] Int. Cl.² .................. F16H 27/04; F16H 55/04
[58] Field of Search ............... 74/436, 84; 354/262, 354/254, 250, 246, 236, 230

[56] References Cited
UNITED STATES PATENTS

| | | | |
|---|---|---|---|
| 3,361,005 | 1/1968 | Carpenter | 74/436 |
| 3,386,636 | 6/1968 | Badalich | 74/436 X |
| 3,552,234 | 1/1971 | Gallina | 74/84 X |
| 3,831,458 | 8/1974 | Takanashi et al. | 74/436 |

*Primary Examiner*—Leonard H. Gerin
*Attorney, Agent, or Firm*—Joseph E. Rusz; Arthur R. Parker

[57] ABSTRACT

A visor-like, protective hood assembly consisting of a segmented shutter for covering an optical window and including three hemispherical shutter segments of increasing radii and pivoted about a common pivot for relocation between a retracted, open and nested relation and an extended, closed position. A drive motor, coupled with a Geneva mechanism, directly and intermittently drives the outermost shutter segment, and trailing edge lips on each segment engage with and respectively drive the intermediate and inner segments to their fully extended, closed positions in a protective relation over tne window.

9 Claims, 12 Drawing Figures

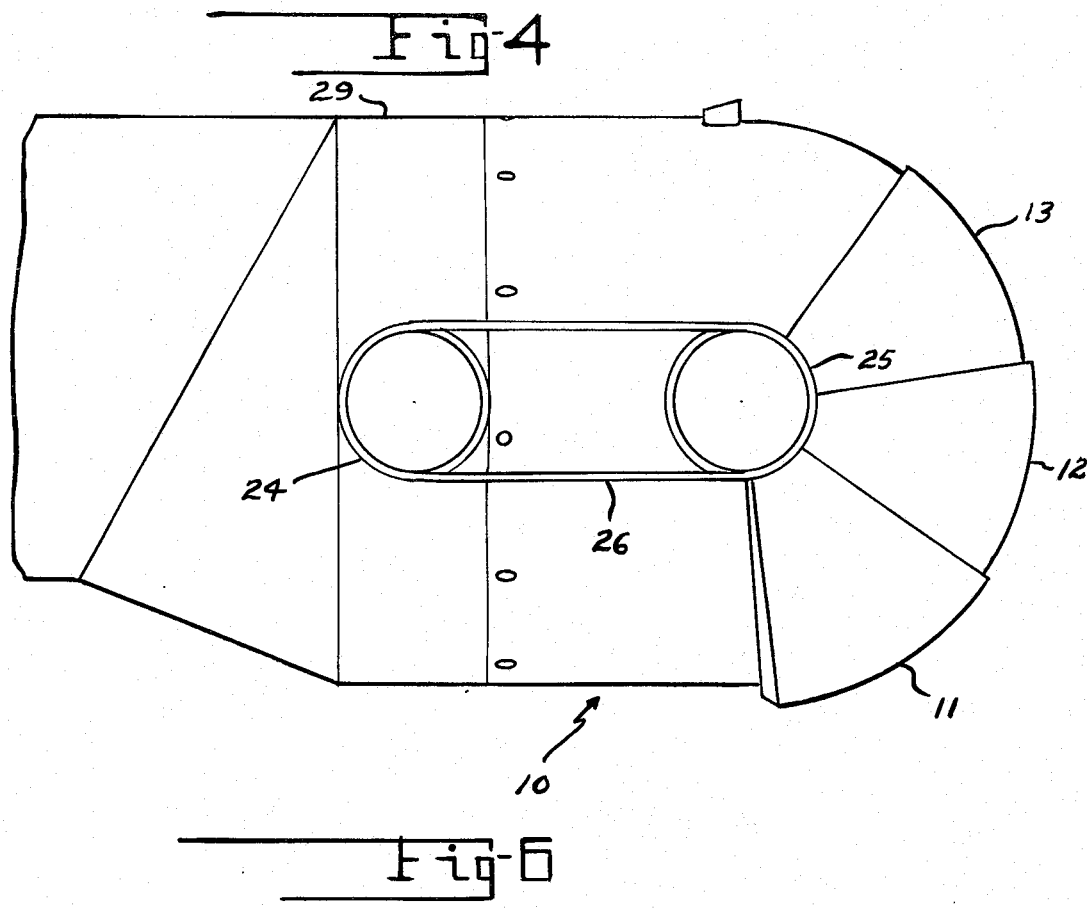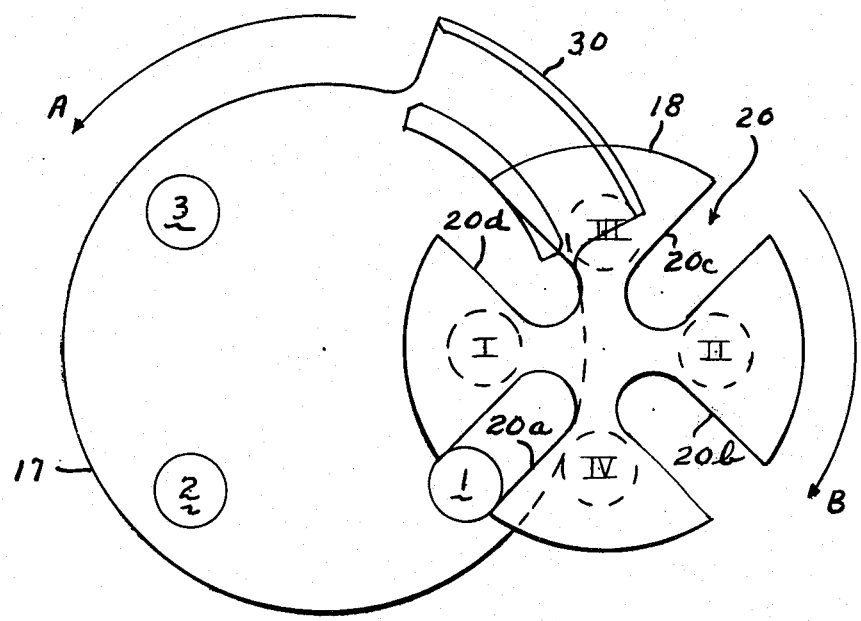

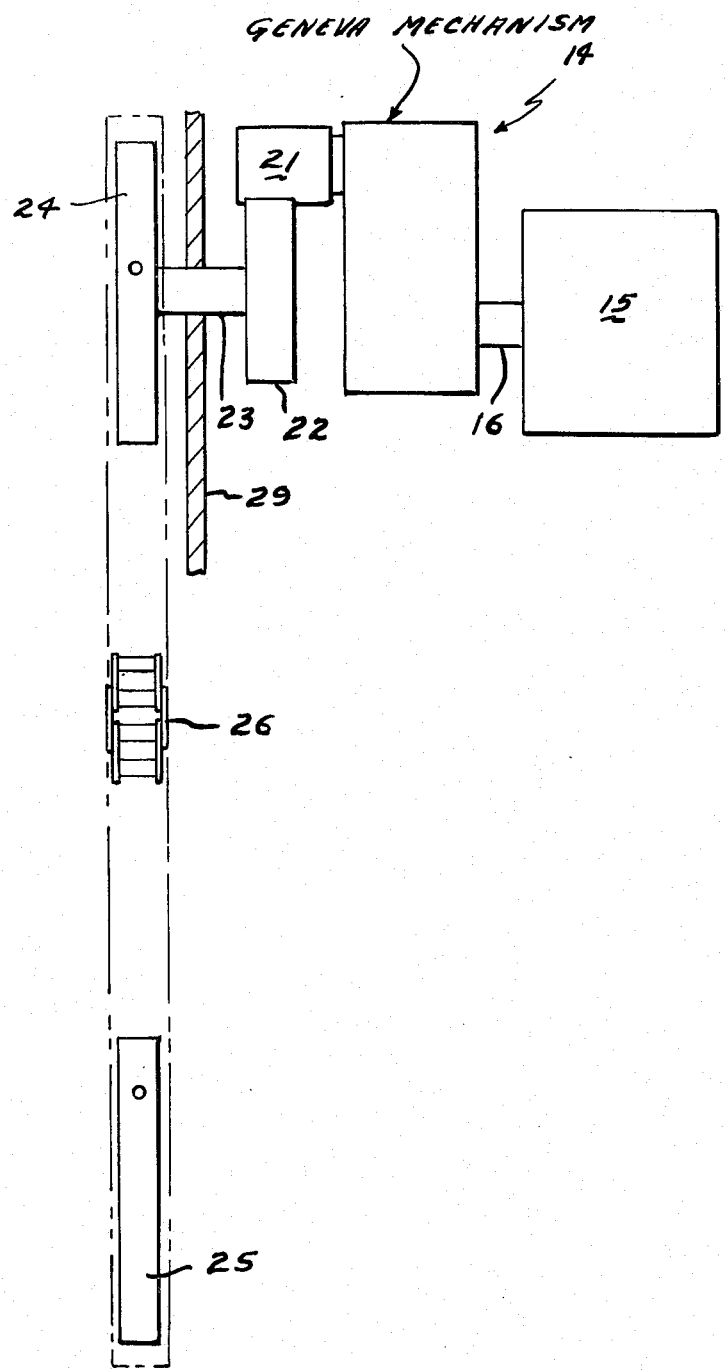

OPTICAL WINDOW PROTECTIVE SHUTTER MECHANISM

RIGHTS OF THE GOVERNMENT

The invention described herein may be manufactured and used by or for the Government of the United States for all governmental purposes without the payment of any royalty.

BACKGROUND OF THE INVENTION

This invention relates generally to a novel technique for covering and thereby protecting optical windows by the use of a visor-like and segmented protective assembly.

The use of a two or more part-segmented cover, shutter or other type assembly of a hollow, spherical configuration and which is pivoted about a common pivot point to be moved between a closed, nested position relative to each other and an extended, open position is broadly old, as is evidenced, for example, in a British Pat. No. 1,350,895, issued July 27, 1971 and, further, as shown in U.S. Pat. Nos. 1,806,366, issued May 19, 1931, and 2,384,646, issued Sept. 11, 1945. Moreover, Geneva movements in general have, likewise, long been used to provide intermittent or sequential motion for various purposes, as is evidenced, for instance, in U.S. Pat. Nos. 959,119, issued May 24, 1910, 2,049,690, issued Aug. 4, 1936, and 2,870,647, issued Jan. 27, 1959. However, as should appear self-evident hereinafter from the following summary and detailed description, the arrangement of the present invention utilizes what is considered to be an improved Geneva mechanism used in an improved manner and further placed in a unique combination with a segmented visor-like hood, cover or shutter assembly in a novel way for providing protection to an optical window.

SUMMARY OF THE INVENTION

The present invention relates to a visor-like hood, cover or shutter assembly that may consist of two or more cover or shutter segments pivoted about a common pivot or axis and being of progressively increasing radii so as to ensure their nested relation to each other when in their open and undeployed condition. The outermost segment is driven by a combined motor drive means and Geneva mechanism that includes, in part, a prime mover-drive motor, a drive shaft, a drive wheel mounted on the drive shaft and a driving wheel that is intermittently driven by the drive wheel, as will be further explained hereinbelow. The Geneva mechanism, which, in the present invention, is considered to be a novel improvement over previously-developed Geneva movements as will appear obvious from the further description thereof to be set forth hereinafter, comprises, in addition to the aforesaid drive and driven wheels, a set of three integral cam follower rotatable drive pins or rollers affixed to, and extending outwardly of the outer face of the drive wheel, in offset relation to the pivot thereof, which drive pins or rollers sequentially engage appropriately located radial slots formed in the driven wheel, which radial slots are open at the periphery of said driven wheel.

The aforementioned driven wheel has an integral pinion on its outer face that engages with an enlarged gear that is mounted on the inner end of an output shaft which, in turn, mounts a drive sprocket on the outer end thereof. A drive chain interconnects between the drive sprocket and a driven sprocket that is rigidly affixed to the outermost cover or shutter segment and is collectively pivotal therewith. With this arrangement, the said outermost cover or shutter segment is directly driven or, in other words, pivoted about the common pivot point or axis by the operation of the drive motor to its closed or deployed position over and in front of the optical window intended to be protected thereby. Of course, the reverse operation of the said motor returns the outermost cover or shutter segment to its open, retracted position. Since the said outermost cover or shutter segment is the only one being directly driven by the drive motor and the interconnecting drive and drive means, as well as the novel Geneva mechanism referred to above, other means consisting of leading and trailing overlaps or lips respectively formed on said segments are used both to deploy and retract the intermediate and inner segments of the plurality of three segments of the instant invention between their opened and closed positions, in the manner to be described in detail hereinafter.

The previously-described drive wheel actually drives the driven wheel through a total of 270° in angular rotation in three distinct and separate 90° steps, upon the completion of which and as is specifically taught by the present invention, a unique dwell period occurs. This results from the use of a dwell channel or channeled segment incorporated on the outer face of the drive wheel at a selected portion of the periphery thereof, which channeled segment respectively engages, in successive order, a first pair of oppositely-disposed dwell pins or rollers, formed on the inner face of the driven wheel, when the cover or shutter segments have been pivoted to their fully extended, deployed position. The latter action initiates the dwell period, during which time the driven wheel is actually locked in position. At the said dwell period initiation, one of a pair of oppositely-disposed cams, utilizable on the inner face of the drive wheel in a conventional manner, engages and actuates a limit switch which shuts off the electrical power to the drive motor, which, coupled with the dynamic, standard braking of the said motor, assures the stopping of the further rotation of the drive wheel well within an additional 90° of angular rotation, during which time the novel dwell period afforded by the unique channeled segment of the drive wheel remains effective to thereby prevent damage to the system during the measurable time period required to fully stop the operation of the drive motor and the rotation of the drive wheel. Of course, the opening of the cover or shutter segments to their retracted, nested position is effected by reversing the operation of the drive motor. Again, the outermost cover or shutter segment is pivoted towards its opened position and, by virtue of a droop lip on the forward edge of the said outermost segment successively engaging the previously-noted forward edge lips on the middle and inner shutter segments, successively picks up and carries the said last-named shutter segments to the retracted, completely open position. Again, at this moment, two operations simultaneously occur; namely, the engagement and actuation of the limit switch by a second cam on the inner face of the drive wheel to thereby shut off the electrical power to the drive motor, and the initiation of another dwell period through the engagement, in consecutive relation, of the uniquely-provided drive wheel-mounted, channeled segment with a second pair of oppositely-disposed dwell pins or rollers disposed along an axis oriented on the driven wheel-inner face in perpendicular relation to the said first-named pair of dwell pins or rollers. Thus, protection against damage to the system is ensured by the unique dwell period built into the novel apparatus of the present invention during the time it takes for the complete stoppage of the drive motor, drive shaft and drive wheel after the electrical power to the motor has been shut off.

Other objects and advantages of the present invention will readily appear hereinafter in the following disclosure, taken in connection with the accompanying drawings, in which:

BRIEF DESCRIPTION OF THE DRAWINGS

FIG. 4 is a schematic, partly broken-away and side-elevational view, depicting some details of the specific relationship between the three-part segmented, protective shutter mechanism of FIGS. 1–3 and the sprocket and chain drive means therefor;

FIG. 5 is another schematic view, partly sectional and broken-away, illustrating certain details of the cover or shutter control drive means, including a general depiction of the improved Geneva mechanism, used with, and as an integral part of the invention;

FIGS. 6, 7 and 8 are other schematic views generally depicting details of the novel Geneva mechanism of the invention and, in particular, illustrating various steps in the operation thereof to reposition the segmented cover or shutter mechanism to its closed position;

DESCRIPTION OF THE PREFERRED EMBODIMENT

Figure 1:
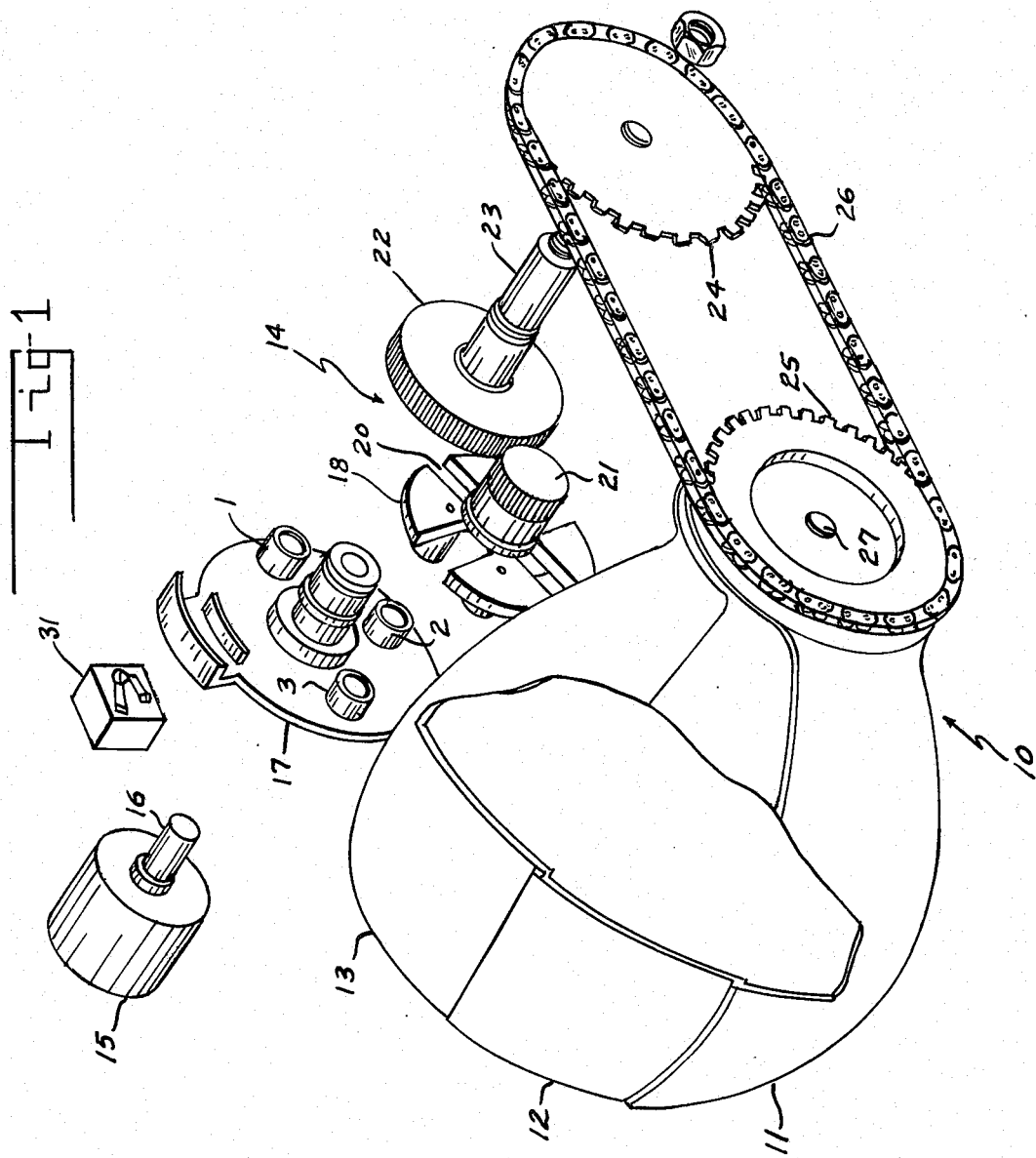
FIG. 1 is an overall schematic, partly broken-away and exploded perspective view illustrating details of the assembled and segmented optical window protective shutter mechanism of the present invention.

Referring generally to the drawings and, in particular, to FIG. 1, thereof, the overall assembly constituting the new and improved optical window protective cover or shutter mechanism of the present invention is indicated generally at 10 as comprising a visor-like segmented cover or shutter device that preferably includes a series of three cover or shutter segments 11, 12 and 13, depicted in their closed, extended and optical window-protective positions in the aforesaid FIG. 1, in a unique combination with a novel cover or shutter control drive mechanism, indicated generally at 14 (note, also FIG. 5). Said cover or shutter control drive mechanism 14 comprises mover-gearhead, reversible drive motor 15 having a drive shaft 16 on which may be affixed the drive wheel 17 of a Geneva-type mechanism that constitutes a key feature of the present invention for the reason that it is improved over conventional Geneva movements in a novel and yet simplified manner to appear self-evident hereinafter. In addition to drive wheel 17, the present Geneva mechanism 14 further includes a star-type, driven wheel 18 that is driven in rotation through means of a series of three cam follower-rotatable pins or rollers 1, 2 and 3 projecting outwardly from the outer face of the drive wheel 17 and which sequentially engage in each of a series of four, relatively elongated, radial slots, indicated generally at 20, formed in the star-type, driven wheel 18. The specific operation of the drive rollers 1, 2, and 3 in the slots 20 will be described in more detail hereinafter in specific connection with FIGS. 6–12, inclusive.

Again, referring to FIGS. 1 and 5, it is seen that the driven wheel 18 incorporates an integral, step-down pinion 21 on its outer face that engages with an enlarged gear 22 integrally formed on the inner end of an output shaft 23 that is shown extending through the optical window-housing wall 29 in FIG. 5. To the outer end of the shaft 23 may be attached a drive sprocket 24 that is in driving engagement with a driven sprocket 25 by means of an interconnecting drive chain, at 26. Sprocket 25 may, as is depicted, be integrally formed to the pivoted, inner end portion of the cover or shutter segment 11 which actually constitutes the outer one of the series of three such segments previously described. As is more clearly depicted in FIG. 2, for example, the segments 11, 12 and 13 may each essentially consist of an equal angle segment of a sphere with appropriate varying diameters or, in other words, of progressively decreasing radii, and, also, pivotally mounted about a common pivot point or axis at 27 to thereby facilitate the concentric or nested stowage thereof when in their open or retracted position, as is illustrated in the aforementioned FIG. 2.

Figure 2:
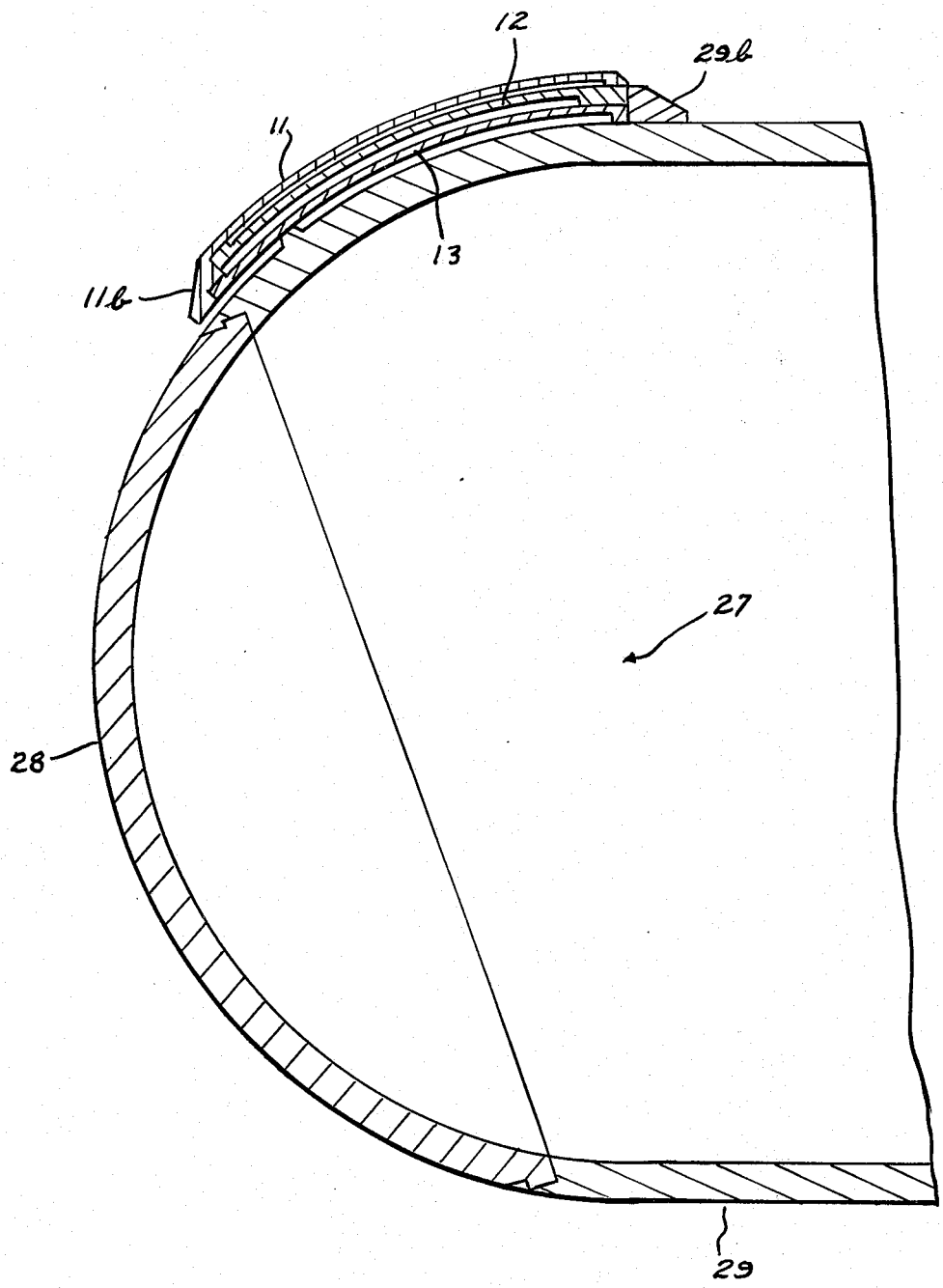
FIGS. 2 and 3 are partly broken-away, somewhat schematic and sectional views respectively showing the protective shutter mechanism of the invention in the opened and closed positions thereof with respect to the optical window to be protected.

Referring specifically to the above-mentioned FIG. 2, the optical window which the inventively operated three-part cover or shutter mechanism 10 is designed to protect when in the closed position is indicated at 28 with the previously-noted housing being used for its support denoted at 29. As has been previously noted, the outer cover segment 11 is the only directly driven element of the set of three. In this regard, after operation of the previously-described cover or shutter control drive mechanism has been initiated to move the segmented cover or shutter 10 from its open position of FIG. 2 to the closed position of FIGS. 3 and 4 in front of, and thereby providing protection to the optical window 28, which motor drive operation initially effects the direct movement of the outer cover segment 11, as noted hereinabove, a lip, as at 11a and 12a, respectively formed on the trailing edges of the said outer cover segment 11 and the middle cover segment 12 automatically engages a complementary lip, as at 12b and 13b, incorporated respectively on the forward edges of the middle and inner cover segments 12 and 13. In successive sequence, therefore, first, the outer cover segment 11 is pivoted from the retracted, open position of FIG. 2 to its closed position (FIGS. 3 and 4) with respect to the optical window 28, followed in order by both the middle and inner cover segments 12 and 13 through the engagement between the aforementioned trailing edge lips 11a and 12a with the corresponding forward edge lips 12b and 13b of the cover segments 12 and 13 located directly beneath the next preceding segment. Of course, inner cover segment 13 is likewise equipped with a trailing edge lip at 13a that engages with a stop element 29A (FIG. 3) formed on the periphery of the housing 29 for thereby providing a positive means of limiting further closing movement of the inventive shutter. With this technique, and when the cover or shutter control drive mechanism is operated in a reverse manner to reposition the cover segments 11, 12 and 13 to their open position of FIG. 2, a so-called "droop" lip 11b on the forward edge of the outer cover segment 11 sequentially engages and thus carries the middle and inner cover segments 12 and 13 to the said retracted, open position in nested relation to each other and collectively against a second limit stop element at 29b.

The Geneva mechanism of the instant invention offers, as in the case of other such mechanisms, intermittent rotary output motion. In addition, it provides, in a unique and yet simplified arrangement, a combined feature including the inherent ability of ensuring that, when a drive roller, as at 1, 2 or 3, mounted on the drive wheel 17 engages one or the other of the radial slots, as at 20 (FIG. 1), formed in the driven, star wheel 18, this engagement occurs while the wheel 18 is at rest and therefore the impact load therebetween is zero. This characteristic, which will be further described in more detail hereinbelow, is already known per se, as is evidenced by the teaching in FIG. 3 of U.S. Pat. No. 2,049,690 previously referred to in the "Background of the Invention". However, the driven, star wheel 18 of the present system is improved thereover by specifically incorporating additional and novel means, to be further described in detail with respect to FIGS. 6–12, for providing a unique "dwell period" both on the closing and the opening of the inventive segmented cover or shutter mechanism to thus ensure against any damage to the apparatus resulting from the continued operation of the cover or shutter control drive mechanism 14.

With particular reference to FIG. 6, the previously-described drive rollers 1, 2 and 3 are clearly depicted as being respectively mounted in a clockwise direction at 90° angles to each other and in each of three quadrants of the drive wheel 17, the fourth, drive roller-free quadrant incorporating a novel channeled segment 30 to provide the unique dwell periods previously referred to hereinabove during both the closing and opening of the inventive cover or shutter mechanism. As will be explained in the following description, said drive rollers 1, 2, 3 sequentially engage in the driven wheel-incorporated, radial slots, indicated generally at 20, and which are open at the periphery of the driven wheel 18 in a conventional manner and as with the drive rollers 1, 2, and 3, are also oriented at 90° angles to each other.

These slots have been denoted more specifically at 20a, 20b, 20c and 20d reading in a clockwise direction. To initiate the pivotal movement of the cover segments 11, 12 and 13 from their open, retracted position of FIG. 2 to their closed, extended position of FIG. 3, the motor 15 (FIG. 1) is actuated to begin the counter-clockwise rotation of both the drive shaft 16 and the drive wheel 17 (note the arrow A in FIG. 6). Upon the said counter-clockwise rotation of the drive wheel 17, initially, the first drive roller 1, which has been previously positioned so that it is about to enter the first radial slot 20a, now actually engages and enters the said slot 20a at its open peripheral end while rotating with the drive wheel 17 in the aforementioned counter-clockwise direction. At this instant, the driven wheel 18 is naturally at rest so that its angular velocity is zero and, therefore, there is no impact load between the driven roller 1 and driven wheel 18. The engagement of the drive wheel-roller 1 with the driven wheel - slot 20a causes the driven wheel 18 to initially accelerate in rotation in a clockwise direction (note arrow B) to a maximum velocity through a 90° arc that is commensurate with the geometry thereof and then subsequently decelerate to zero velocity, stopping further rotation of the driven wheel 18 as the drive roller 1 exits from the slot 20a, depicted in FIG. 7. It is noted that this feature incorporated in the present apparatus is already known per se since it is specifically taught in the previously-referred to FIG. 3 of U.S. Pat. No. 2,049,690. As explained in the latter patent, due to the straight configuration of the radial slots and the movement of the drive rollers, as at 1, along a curved path initially into the slot and then away from the slot, as at 20a, the maximum acceleration being imparted to the driven wheel 18 increases until the point at which the drive roller 1 reverses its direction relative to the radial slot from an entering to an exiting condition.

Figure 3:
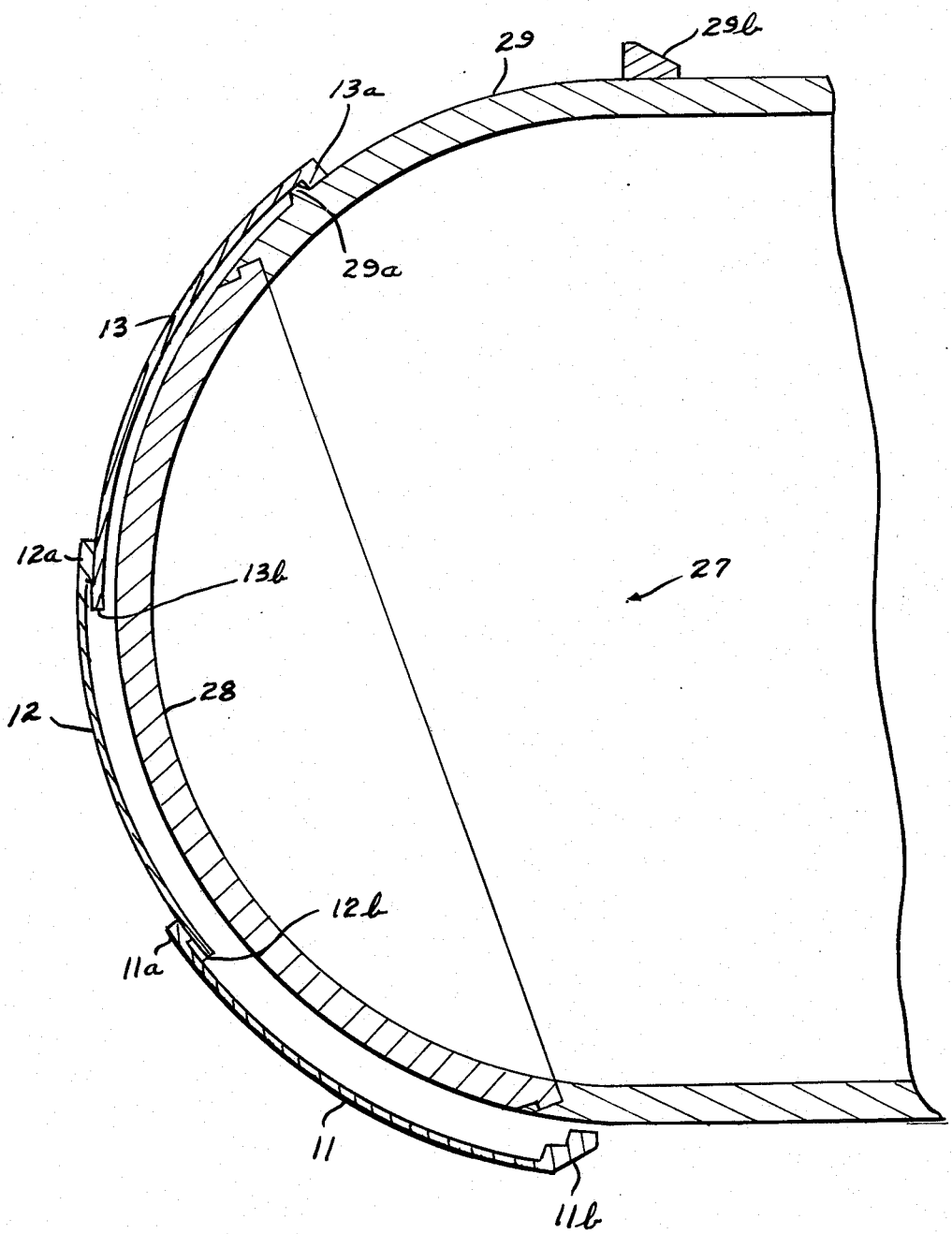

As was previously-described with particular reference to FIG. 1, the angular motion or rotation being imparted to the driven wheel 18 is transferred by a step-down gear train (also note FIG. 5) first to the drive sprocket 24 and then to the driven sprocket 25 through the interconnecting, drive chain 26. Driven sprocket 25 is, of course, affixed with and thus effects the simultaneous pivoting of the outer cover or shutter segment 11 to its closed position relative to the optical window 28 (FIG. 3). The gear ratio between the pinion 21 (FIG. 1) integral with the driven wheel 18 and enlarged gear 22 integral with the output shaft 23 mounting the drive sprocket 24 is chosen such that the angular movement imparted to the driven wheel 18 by roller 1 from the moment it enters the slot 20a until departing the said slot causes the outer cover or shutter segment 11 to pivot from its open position of FIG. 2 through an approximate 45° angle to where the lip 11a (FIG. 3) on its aft end or trailing edge will engage the lip 12b on the forward edge of the middle cover or shutter segment 12. It is, of course, at this moment that the driven wheel 18 has now come to a rest position because of the reverse movement and exit of the drive roller 1 from the radial slot 20a, as explained hereinabove. Thus, the outer cover - trailing edge lip 11a engages the middle cover - forward edge lip 12b in a zero velocity and impact-free manner.

Figure 7:
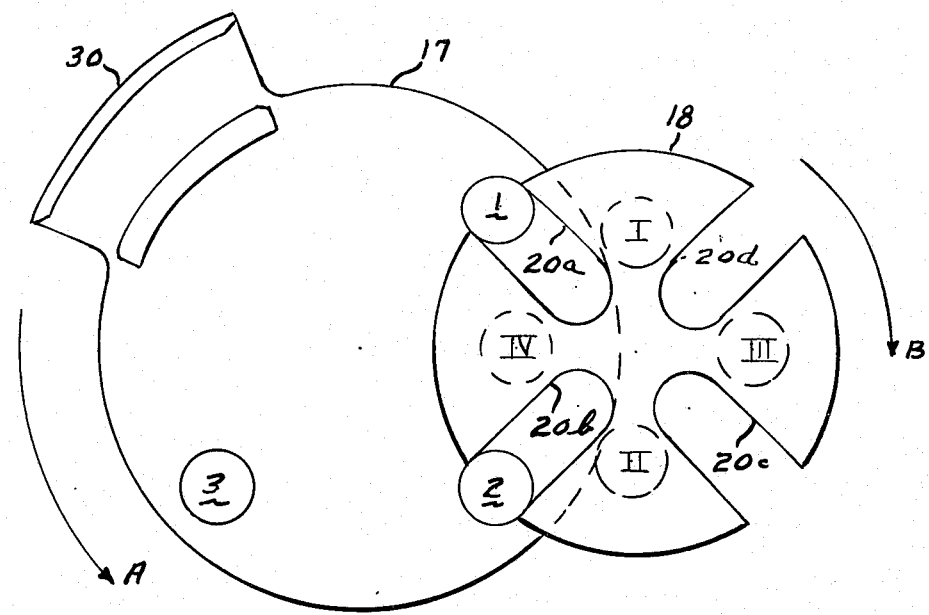

With particular reference to FIG. 7, it is clearly depicted that as roller 1 exits from the slot 20a, the second drive roller 2 has now reached a position where it is entering the next or second slot in the driven wheel 18; namely, slot 20b. Of course, roller 2 is now entering slot 20b due to the previous rotation of the driven wheel 18 by the roller 1 through an initial angle of 90°. Once again, the driven wheel 18 is driven by the second drive roller 2 through a second 90° angle or now a total of 180° from its original orientation, simultaneously causing both cover or shutter segments 11 and 12, because of the now-engaged lips 11a and 12b, to collectively pivot further into their closed positions in front of the optical window 28 (FIG. 3) where the aft end or trailing edge lip 12a on the middle segment 12 immediately thereafter engages a forward edge lip 13b on the inner cover or shutter segment 13. Again, this engagement will occur at zero velocity and no impact forces will result therebetween.

Figure 8:
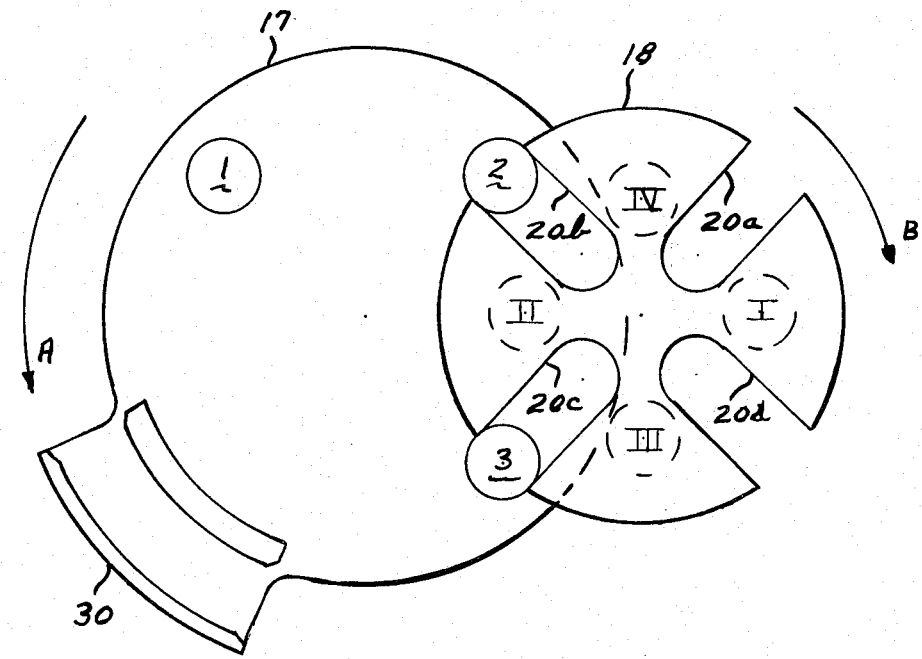
Figure 9:
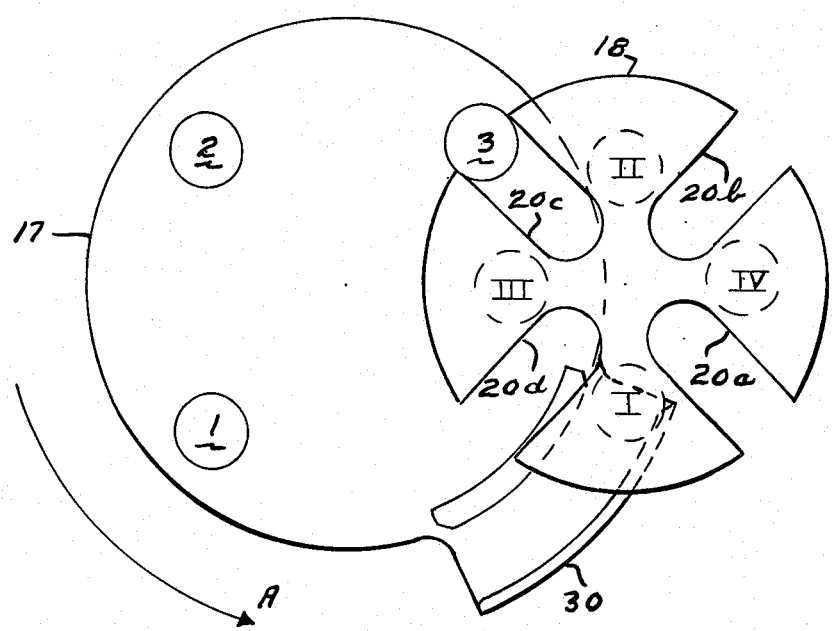
FIGS. 9 and 10 are further schematic views of the operation of the inventive Geneva mechanism of FIGS. 6, 7 and 8, showing the condition thereof when all three of the cover or shutter segments are in their closed position and the novel dwell period of the invention is being both initiated and maximized after such closing has been completed.
Figure 10:
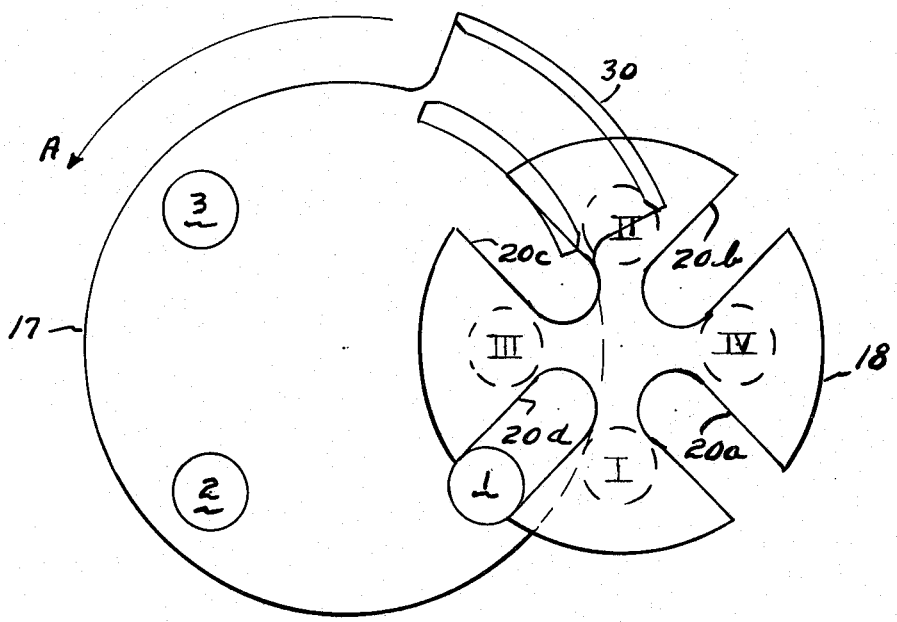

As the above-outlined second drive roller 2 is exiting from the slot 20b in the driven wheel 18, as seen in FIG. 8, the third drive roller 3 is entering the next or third slot 20c in the driven wheel 18. Again, the rotation of the driven wheel 18 by the said third drive roller 3, which is now the third 90° increment through which the driven wheel 18 is rotated for a grand total of 270°, will now effect the simultaneous rotation of all three interengaging cover or shutter segments 11, 12 and 13 to their completely closed and overlapping positions in protective relation in front of the optical window 28 as is clearly indicated in the aforementioned FIG. 3 (note also FIG. 4). Naturally, the arrival of all three cover or shutter segments 11, 12 and 13 in their final, completely closed position will once again occur at zero velocity for the same reasons previously discussed.

In partial summary, therefore, the Geneva mechanism 14 provides for 90° increments of movement of the driven wheel 18. This movement, in conjunction with the gearing 21 and 22 and the drive sprocket 24, can produce the desired incremental travel of the shutters 11, 12 and 13 in approximate 45° increments. It is to be understood, however, that the shutters can be pivoted in any desired increment simply by altering the gear ratios and/or the ratio of drive sprocket 24 to driven sprocket 25.

In accordance with the still further teachings of the present invention, after the previously-described cover or shutter segments 11, 12, 13 have been fully closed, a unique feature of the inventive Geneva mechanism comes into play; namely, the inherent ability to provide a built-in period that positively ensures that no output or continued rotation of the driven wheel 18 is effected even though the drive wheel 17 continues to rotate during the relatively short time period required for shutting down the drive motor 15. This period of non-rotation of the driven wheel 18, known as the "dwell" period, results from the featuring of a channeled segment, seen at 30 in FIGS. 6–12, which channeled segment 30 is uniquely built into, or made integral with and projects outwardly of a portion of the circumference of the said drive wheel 17 at the remaining quadrant thereof not equipped with a drive roller, as at 1, 2 or 3. To bring the said dwell period into operation at the appropriate times, the drive wheel 17 is further equipped with a series of four rotatable dwell pins or rollers, indicated at I, II, III and IV as being integral with, and projecting outwardly of the inner face of the said drive wheel 17. Thus, as viewed in FIG. 9, initiation of the inventive dwell period is effected by the automatic engagement of the said driven wheel - incorporated, channeled segment 30 with the first dwell pin, or roller I, just as the third drive roller 3 on the said drive wheel 17 is exiting from the driven wheel - third slot 20c. Once the said automatic engagement occurs between the said channeled segment 30 and dwell roller I, the drive wheel 17 can continue to rotate without causing any further movement in rotation of the driven wheel 18. In other words, the latter wheel 18, as well as the shutter covers 1, 2 and 3, are now locked in their previous adjustment in rotation of a total of 270° throughout the dwell period. The said dwell period continues from its initiation in FIG. 9 to its maximum extent of FIG. 10, or, in other words, until the second dwell roller II, which is initially engaged within the channeled segment 30 on the exiting therefrom of the first dwell pin I, is cleared by the said channeled segment 30, this occurring only after a total 90° rotation dwell period has ensued. At this time, the first drive roller 1 on the drive wheel 17 has again entered a slot, namely, the fourth slot at 20d in the driven wheel 18. However, in accordance with the still further teachings of the present invention, no effort can now be made to repeat the foregoing sequence of operating the above-described segmented cover or shutter mechanism comprising segments 11, 12 and 13 which are now in their fully closed position in front of the optical window 28 and cannot be physically rotated any further. Naturally any continued application of force on the drive wheel 18 would cause a build-up of static stresses, eventually damaging the bearings and gears. Therefore, at the instant the dwell period - creating, channeled segment 30 engages the first dwell roller I, one of a pair of oppositely disposed cams (not shown) placed, for example, on the inner face of the drive wheel 17 would engage and actuate a limit switch 31 (FIG. 1) to turn off the electrical power and stop further operation of the motor 15. This, coupled with the conventional dynamic braking thereof, would assure that the motor 15 and its drive shaft 16 would come to a complete stop well within the 90° dwell rotation period specifically provided for this novel purpose by the unique channeled segment 30.

Figure 11:
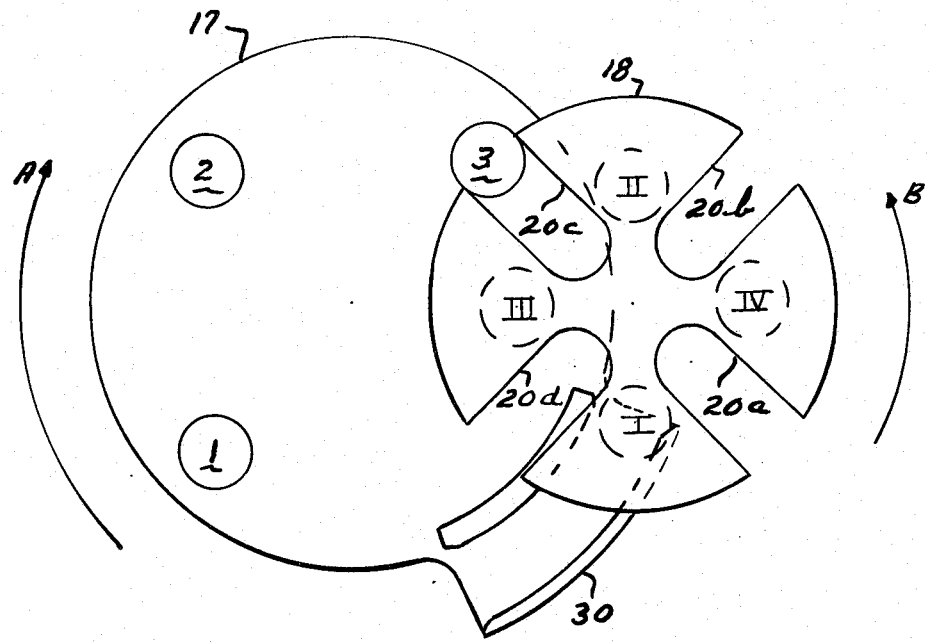
FIGS. 11 and 12 represent additional schematic views of the Geneva mechanism of FIGS. 6–10, depicting the condition thereof when the cover or shutter segments of the present assembly are in their closed and open positions and further showing the steps involved in the outermost cover or shutter segment initiating the retraction of all three segments to their opened position (FIG. 11), and additionally again showing the initiation of the unique dwell period involved with the operation of the inventive apparatus after the shutter mechanism has been moved to its open position.
Figure 12:
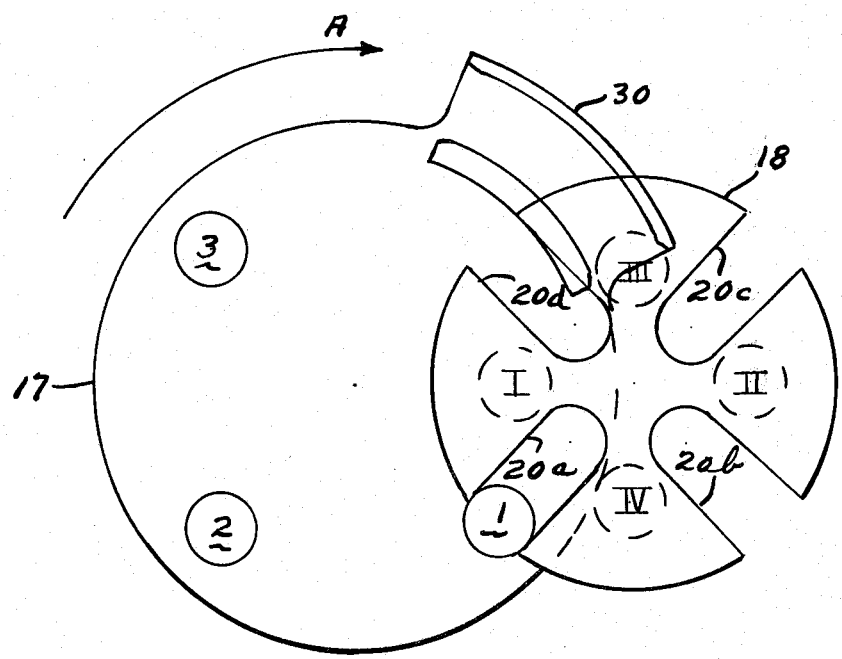

To operate the cover or shutter segments 11, 12 and 13 to their open position relative to the optical window 28 or, in other words, to initiate their retraction into the nested position of FIG. 2, the gearmotor 15 is reversed to thus now rotate the drive wheel 17 in the opposite or clockwise direction, as in FIG. 11 (see arrow A). The drive wheel 17 will then rotate without effecting any movement of the driven wheel 18 until the previous dwell period has been retracted. As the channeled segment 30 of the drive wheel 17 clears dwell roller I on the driven wheel 18, the third drive roller 3, as viewed in FIG. 11, on the said drive wheel 17 begins re-entering the third slot 20c which it had previously departed. This action will effect rotation of the said driven wheel 18 in the counterclockwise direction (note arrow B), causing cover or shutter segment 11 to rotate toward its open position of FIG. 2. As the said drive roller 3 reaches its exit position from the slot 20c, again slowing down the rotating driven wheel 18 to zero velocity, and the second drive roller 2 enters the next slot 20b, cover or shutter segment 11 will have rotated 90° in the open direction until the previously-described overhanging or droop lip 11b (FIG. 3) on its forward edge has just come into contact with the forward edge or lip 12b of the middle cover or shutter segment 12, again, at zero velocity. Said drive roller 2 now further rotates the driven wheel 18 a second 90° increment to thereby cause the outer and middle cover or shutter segments 11, and 12 to similarly rotate an approximate 45° towards their opened positions. Thereafter, drive roller 2 exits its slot 20b and drive roller 1 enters the next slot 20a and, again, the overhanging or droop lip 11b on the forward edge of the outer segment 11 will engage the forward edge or lip 13b of the inner segment 13 (FIG. 3) at zero velocity as before. Simultaneously therewith, drive roller 1 is entering the radial slot 20a and causes all three of the cover or shutter segments 11, 12 and 13 to now collectively pivot together into the fully open position of FIG. 2. At this time, once more, the unique dwell period of the instant invention automatically comes into operation with the drive roller 1 exiting the slot 20a in the driven wheel 18, whereupon, the channeled segment 30 of the driven wheel 17 now begins to engage the driven wheel-mounted, dwell roller III and, again, a dwell period is initiated, as has been depicted in FIG. 12. Of course, at this instant, the second of the conventional and oppositely-disposed pair of cams (not shown) on the inner face of the drive wheel 17 has now been rotated to a position of engagement with, and operation of the limit switch 31 (FIG. 1) to again shut off the electrical power to the motor 15. Of course, as in the case of the opening the cover or shutter segments 11, 12, and 13, with the combination of the unique channeled segment 30 on the circumference of the drive wheel 17 to thereby produce a dwell period for another 90° of rotation, there will be a positive assurance that the drive motor 15, when shut off by the conventional engagement of the previously-mentioned drive wheel - mounted cam with a standard limit switch, as at 31, and the dynamic braking thereof in any standard and already-available manner, will have more than ample time to completely cease operations before any damage to the apparatus can be accomplished.

Although the foregoing description is had with respect to a segmented shutter mechanism specifically designed for use with an optical window such as may be used in an infrared air-to-ground weapon delivery system, it is to be understood that the invention is obviously of greater utility and is limited only by the appended claims.

We claim:

1. A visor-like, shutter mechanism comprising; a plurality of separate cover members mounted for pivotal movement about and progressively varying in radius relative to, a common pivot; a cover control drive means interconnected in driving relation with said shutter mechanism for respectively repositioning said separate cover members between a first, open, retracted, inactive and nested relation to each other, and a second, closed, extended and active position; said cover control drive means comprising; a reversible drive motor including a drive shaft; a Geneva-type mechanism comprising; a first drive element in operable relation to, and being driven by said drive shaft, a first driven element incorporating an output shaft, and first, periodically-effective and selectively operative interconnecting-drive actuating means disposed with, and between said first drive element and said first driven element; second, cover member - actuating means incorporating and being driven by said output shaft, and further including adjustably positionable means directly interconnected with the outermost cover member; said cover members incorporating overhanging lip portions on their forward and trailing edges respectively engageable with each other to thereby ensure the collective repositioning of all of the said cover members either to their closed or open positions when the said outermost cover member is being pivoted by said cover control drive means; and periodically-operative, locking means disposed between said first drive element and said first driven element automatically effective during the final pivoted movement of said plurality of cover members either to their closed or open positions to provide a predetermined dwell period during which the first driven element is locked in its final angularly adjusted position and the first drive element is allowed to move in angular position relative thereto in the time required to fully stop operation of the drive motor to thereby prevent any inadvertent damage.

2. A visor-like, shutter mechanism as in claim 1, wherein said adjustably positionable means comprises a second driven element affixed to and pivotally moved with the outermost cover member.

3. A visor-like, shutter mechanism as in claim 2, wherein said second, cover member - actuating means comprises a second drive element.

4. A visor-like, shutter mechanism as in claim 3, wherein said second driven element comprises a driven sprocket integrated with said outermost cover member.

5. A visor-like, shutter mechanism as in claim 4, wherein said second drive element comprises a drive sprocket integrally formed on one end of said output shaft.

6. A visor-like, shutter mechanism as in claim 5, and a sprocket drive-chain interconnected in driving relation between said first and second-named sprockets.

7. A visor-like, shutter mechanism as in claim 6, wherein said output shaft incorporates an enlarged drive gear; and said first driven element comprises a driven wheel member having a pinion gear meshing in driving and step down relation with said output shaft-mounted gear.

8. A visor-like, shutter mechanism as in claim 7, wherein said first drive element comprises a drive wheel member mounted on the end of said drive shaft; and said first, periodically-effective and selectively operative interconnecting-drive actuating means comprises; a first plurality of drive rollers mounted on, and projecting outwardly of the face of said drive wheel member, and a second plurality of radial slots formed in the said driven wheel member and selectively and sequentially engageable with said drive rollers to thereby provide for the intermitent rotation of said driven wheel member and the outermost cover member in driving relation therewith when said drive motor is actuated.

9. A visor-like, shutter mechanism as in claim 8, wherein said periodically-operative and dwell period-producing, locking means comprises; a channeled segment formed adjacent the portion of the periphery of said drive wheel member at the quadrant thereof not equipped with a drive roller; and a first and second pair of predeterminedly-spaced dwell rollers incorporated at right angles to each other on the face of said driven wheel member and engageable within said channeled segment at the appropriate time when either the plurality of cover members have reached their fully closed or fully opened positions to thereby allow the said dwell period to occur while simultaneously locking the driven wheel member and plurality of cover members in their previously-adjusted angular position of rotation.

* * * * *